(12) United States Patent
Dame et al.

(10) Patent No.: US 9,521,678 B2
(45) Date of Patent: Dec. 13, 2016

(54) WIRELESS DATA CONCENTRATORS FOR AIRCRAFT DATA NETWORKS

(71) Applicant: The Boeing Company, Chicago, IL (US)

(72) Inventors: Stephen G. Dame, Everett, WA (US); Yakentim M. Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 55 days.

(21) Appl. No.: 14/656,623

(22) Filed: Mar. 12, 2015

(65) Prior Publication Data
US 2016/0270052 A1    Sep. 15, 2016

(51) Int. Cl.
| | |
|---|---|
| *H04B 7/00* | (2006.01) |
| *H04W 72/04* | (2009.01) |
| *H01Q 1/22* | (2006.01) |
| *H01Q 1/38* | (2006.01) |
| *H01Q 1/52* | (2006.01) |
| *H01Q 9/04* | (2006.01) |
| *H01Q 21/28* | (2006.01) |
| *H04B 1/40* | (2015.01) |
| *H04W 4/00* | (2009.01) |

(52) U.S. Cl.
CPC ......... *H04W 72/048* (2013.01); *H01Q 1/2291* (2013.01); *H01Q 1/38* (2013.01); *H01Q 1/521* (2013.01); *H01Q 1/526* (2013.01); *H01Q 9/04* (2013.01); *H01Q 9/0421* (2013.01); *H01Q 21/28* (2013.01); *H04B 1/40* (2013.01); *H04W 4/005* (2013.01)

(58) Field of Classification Search
CPC ........ H04W 72/048; H04W 4/005; H04B 1/40
See application file for complete search history.

(56) References Cited

U.S. PATENT DOCUMENTS

| | | | |
|---|---|---|---|
| 6,225,951 B1 * | 5/2001 | Holshouser | H01Q 1/38 343/700 MS |
| 6,944,475 B1 * | 9/2005 | Campbell | H04B 1/005 455/431 |
| 7,319,854 B2 | 1/2008 | VonDoenhoff et al. | |

(Continued)

FOREIGN PATENT DOCUMENTS

EP    2541853 A1    1/2013

*Primary Examiner* — Robert Wilson
(74) *Attorney, Agent, or Firm* — Duft Bornsen & Fettig LLP

(57) ABSTRACT

Embodiments described herein provide for a four-channel Wireless Data Concentrator (WDC) for a data network of an aircraft. One embodiment of a WDC includes a Printed Circuit Board (PCB), and a controller. The controller is electrically coupled to a top surface of the PCB and is proximate to a centerline of the PCB. The WDC further includes four Radio Frequency (RF) transceivers electrically coupled to the top surface of the PCB that are disposed orthogonally to each other around the controller. Each RF transceiver communicates with at least one wireless sensor that measures an environment of the aircraft. The WDC further includes four inverted-F PCB trace antennas fabricated along the top surface of the PCB. Each inverted-F PCB trace antenna is electrically coupled to one of the RF transceivers and is disposed orthogonally to each other around the controller.

17 Claims, 7 Drawing Sheets

(56) References Cited

U.S. PATENT DOCUMENTS

| | | | |
|---|---|---|---|
| 7,907,091 B2* | 3/2011 | Zhang | H01Q 1/38 343/700 MS |
| 7,948,769 B2* | 5/2011 | Jakab | H01Q 1/243 361/799 |
| 8,797,842 B2 | 8/2014 | Dame | |
| 8,847,754 B2 | 9/2014 | Buchheim et al. | |
| 2004/0198293 A1* | 10/2004 | Sadler | H01Q 1/243 455/280 |
| 2005/0156799 A1 | 7/2005 | Theobold | |
| 2006/0234787 A1* | 10/2006 | Lee | H05K 7/1412 455/575.7 |
| 2011/0133891 A1 | 6/2011 | Krug et al. | |
| 2011/0299470 A1* | 12/2011 | Muller | H04Q 9/00 370/328 |
| 2012/0306700 A1 | 12/2012 | Ridgeway | |
| 2013/0003620 A1* | 1/2013 | Dame | H01Q 1/007 370/310 |
| 2013/0196716 A1* | 8/2013 | Muhammad | G06F 3/03545 455/566 |
| 2014/0043190 A1* | 2/2014 | Vummidi Murali | H01Q 1/38 343/700 MS |
| 2014/0192845 A1 | 7/2014 | Szini et al. | |
| 2014/0266923 A1* | 9/2014 | Zhou | H01Q 5/35 343/702 |
| 2015/0242888 A1 | 8/2015 | Zises | |
| 2015/0303568 A1* | 10/2015 | Yarga | H01Q 5/321 343/720 |
| 2016/0270052 A1* | 9/2016 | Dame | H01Q 1/526 |

\* cited by examiner

US 9,521,678 B2

WIRELESS DATA CONCENTRATORS FOR AIRCRAFT DATA NETWORKS

FIELD

This disclosure relates to the field of wireless networks, and in particular, to wireless networks onboard aircraft.

BACKGROUND

Modern aircraft systems are becoming more and more complex over time. This increasing complexity has led to an increased desire for the monitoring of the health and operation of such systems. While a strictly wired approach may be feasible when the total numbers of sensors is low, modern aircraft may utilize hundreds or even thousands of sensors which monitor the various systems in the aircraft. However, routing and maintaining physical wired connections with such a large number of sensors becomes impractical.

One solution utilized to support a growing number of sensors on an aircraft is the use of wireless sensors. Wireless sensors can be distributed at will throughout the aircraft, without the penalty of wiring each sensor back to a centralized data monitoring system. The use of wireless sensors in an aircraft allows the aircraft designer more freedom in monitoring the various systems onboard the aircraft.

The typical wireless sensors used on an aircraft are low power devices that operate at a short range for a number of reasons. One reason is that it is desirable that the RF transmissions generated by the wireless sensors do not interfere with the operation of the aircraft. Another reason is that the RF spectrum that is available for use by the wireless sensors is not unlimited. Rather, only a finite number of wireless channels may be available to support the data communication activities of some hundreds or thousands of wireless sensors. For example, wireless sensors that are based on the Institute of Electrical and Electronic Engineers (IEEE) 802.15.4 standard are limited to one channel in Europe in the 868.0-868.6 megahertz (MHz) band, thirty channels in North America in the 902-928 MHz band, and sixteen channels worldwide in the 2400-2483.5 MHz band.

Due to the increasing number of wireless sensors that are desired by aircraft designers, it is important to utilize the limited RF resources efficiently and to provide the wireless sensors a gateway into the data network of the aircraft.

SUMMARY

Embodiments described herein provide for a four-channel wireless data concentrator for a data network of an aircraft. The wireless data concentrator is capable of communicating with wireless sensors onboard the aircraft, and to provide measurement data generated by the wireless sensors about the environment of the aircraft to an application server of the data network. The wireless data concentrator is also capable of supporting redundant wireless connections to wireless sensors to improve the reliability of the data network.

One embodiment is wireless data concentrator for a data network of an aircraft. The wireless data concentrator includes a Printed Circuit Board (PCB) having a top surface and a bottom surface, and a controller electrically coupled to the top surface of the PCB and proximate to a centerline of the PCB. The wireless data concentrator further includes four Radio Frequency (RF) transceivers electrically coupled to the top surface of the PCB that are disposed orthogonally to each other around the controller. Each RF transceiver communicates with at least one wireless sensor that measures an environment of the aircraft. The wireless data concentrator further includes four inverted-F PCB trace antennas fabricated along the top surface of the PCB. Each inverted-F PCB trace antenna is electrically coupled to one of the RF transceivers and is disposed orthogonally to each other around the controller. The controller receives sensor data about the environment of the aircraft from the at least one wireless sensor, and provides the sensor data to an application server of the data network of the aircraft.

Another embodiment is a wireless data concentrator for a data network of an aircraft. The wireless data concentrator includes a PCB and a controller. The controller is electrically coupled to the PCB. The wireless data concentrator further includes four Radio Frequency (RF) transceivers electrically coupled to the PCB that are disposed around the controller. Each RF transceiver communicates with at least one wireless sensor that measures an environment of the aircraft. The wireless data concentrator further includes four inverted-F PCB trace antennas fabricated into the PCB. Each inverted-F PCB trace antenna is electrically coupled to one of the RF transceivers and is disposed orthogonally to each other around the controller. The controller receives sensor data about the environment of the aircraft from the at least one wireless sensor, and provides the sensor data to the data network of the aircraft.

Another embodiment is a wireless data concentrator for a data network of an aircraft. The wireless data concentrator includes a controller. The controller is electrically coupled to a PCB. The wireless data concentrator further includes four Radio Frequency (RF) transceivers electrically coupled to the PCB that are disposed around the controller. Each RF transceiver communicates with at least one wireless sensor that measures an environment of the aircraft. The wireless data concentrator further includes four PCB trace antennas fabricated into the PCB. Each PCB trace antenna is electrically coupled to one of the RF transceivers and is disposed orthogonally to each other around the controller. The controller receives sensor data about the environment of the aircraft from the at least one wireless sensor, and provides the sensor data to the data network of the aircraft.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
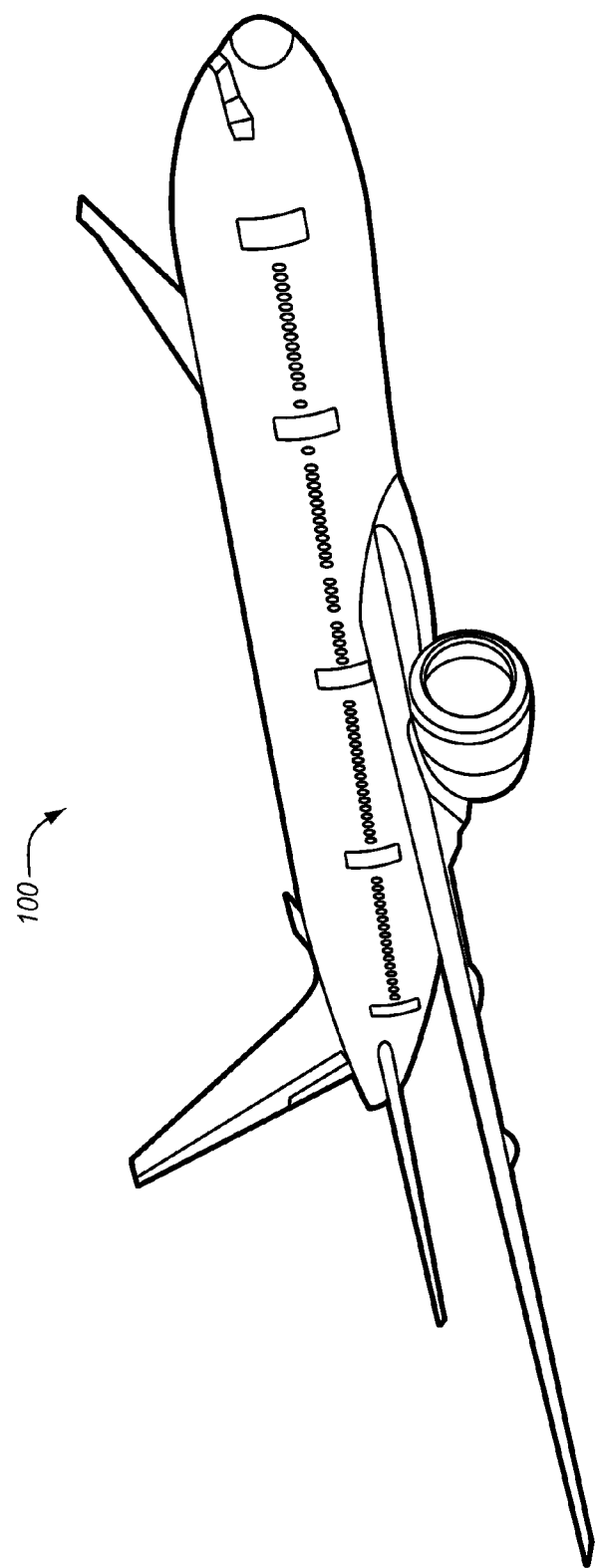
FIG. 1 illustrates an aircraft implementing a wireless sensor network in an exemplary embodiment.

FIG. 1 illustrates an aircraft 100 implementing a wireless sensor network in an exemplary embodiment. In this embodiment, aircraft 100 includes a data network (not shown in FIG. 1), which collects sensor information about aircraft 100 from a number of wireless sensors (also not shown in FIG. 1) to allow for the monitoring of the various systems that are utilized onboard aircraft 100.

As modern aircraft have evolved over the years to become quite complex systems, problems arise when attempting to physically wire a large number of sensors that may be desired across aircraft 100 to the data network onboard aircraft 100. Wires add weight and complexity to aircraft 100, and the wires become a possible source of failure in aircraft 100 due to breakage, shorting, etc. Although it may be desirable to include some hundreds or thousands of sensors onboard aircraft 100, to do so is a trade-off in weight and reliability. To this end, wireless sensors have emerged as one possible solution to the complexity and weight drawback of implementing a large number of sensors onboard aircraft 100. The wireless sensors may be distributed throughout aircraft 100, since they are no longer limited to a physical connection back to the data network onboard aircraft 100. However, while an RF link back to the data network onboard aircraft 100 eliminates the wired data connection, managing such a large number of RF links back to the data network can be problematic.

For example, it would be impractical to implement a single RF gateway that could couple the multitude of wireless sensors into the data network, since such a gateway would be tasked with managing the hundreds or thousands of wireless links that would be utilized by such a large number of wireless sensors. Further, the wireless sensors that would be typically used onboard aircraft 100 are low power devices with limited range. This is to ensure that the wireless sensors do not interfere with the operation of the systems onboard aircraft 100. Further still, the RF channels that are typically available for such wireless sensors are often limited. For instance, if the wireless sensors comply with the IEEE 802.15.4 specification, then only a limited number of RF channels may be available based on where in the world aircraft 100 is operating. IEEE 802.15.4 currently limits the number of RF channels for worldwide use to sixteen. Therefore, there is a need to implement a number of short-range wireless data concentrators across aircraft 100, which are used to communicate with smaller portions of the total numbers of wireless sensors that may be implemented onboard aircraft 100. The data concentrators, or wireless data concentrators, each communicate with some smaller subset of the total number of wireless sensors onboard aircraft 100, concentrating and coordinating the flow of sensor data back to the data network onboard aircraft 100.

Figure 2:
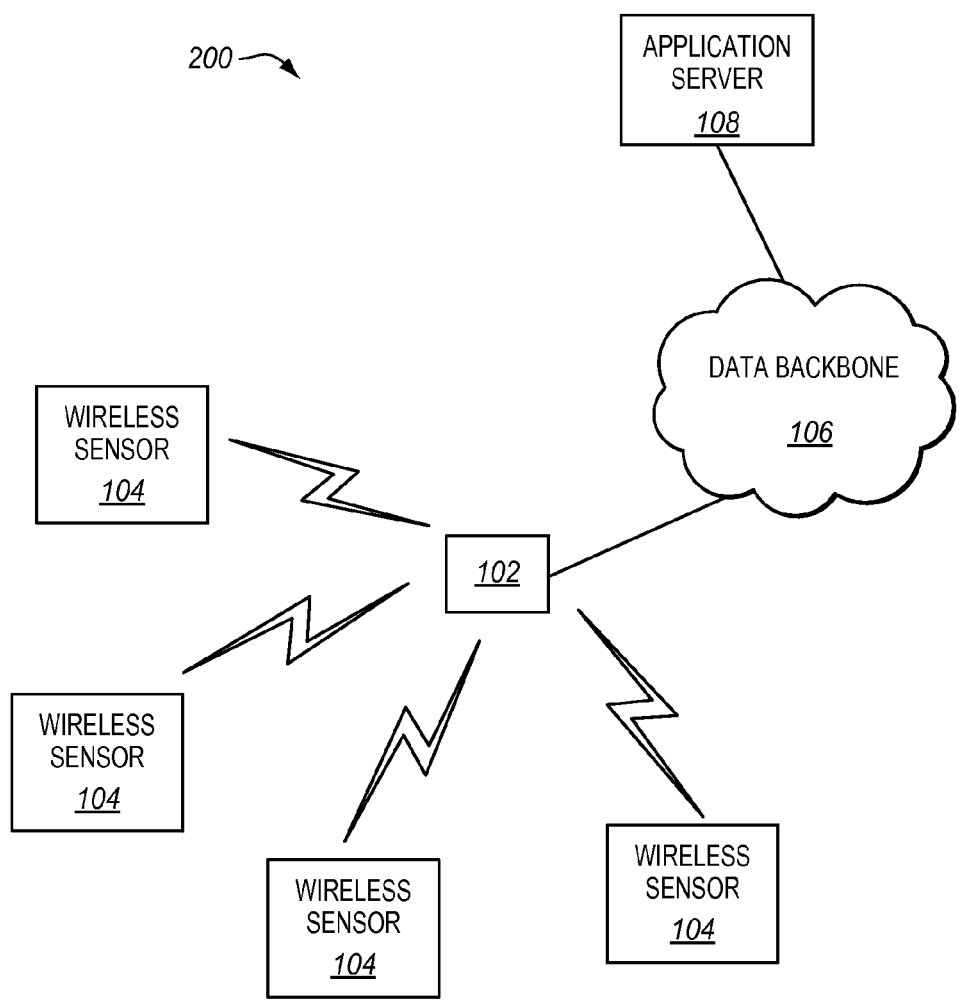
FIG. 2 is a block diagram of a simplified data network for an aircraft in an exemplary embodiment.

FIG. 2 is a block diagram of a simplified data network 200 for aircraft 100 in an exemplary embodiment. In this embodiment, network 200 includes one or more four-channel wireless data concentrators (WDC) 102, although only one WDC 102 is illustrated in this simplified view of network 200. WDC 102 in this embodiment communicates with one or more wireless sensors 104 via RF. For example, WDC 102 may communicate with wireless sensors 104 utilizing four of the sixteen IEEE 802.15.4 RF channels that are available for worldwide use. Although only four wireless sensors 104 are illustrated in FIG. 2, WDC 102 is not limited to communicating with just four wireless sensors 104. For example, WDC 102 may utilize time division multiplexing, RF channel re-assignments, modulation techniques, etc., to effectively communicate with any number of wireless sensors 104 simultaneously or nearly simultaneously. Thus, the number of wireless sensors 104 that may be in communication with WDC 102 may be function of wireless range, RF channel capacity, processing capability, etc.

In this embodiment, wireless sensors 104 measure the various conditions onboard aircraft 100, and provide the measurements to WDC 102. Some examples of the types of data that may be measured by wireless sensors 104 include temperature, humidity, vibration, sound levels, the position of flight control surfaces, pressures, valve positions, engine parameters, etc. These are just a few of the types of data that may be measured by wireless sensors 104, and one skilled in the art will recognize that wireless sensors 104 include any component, system, or device that is able to provide measurement data to WDC 102 over a wireless link.

WDC 102 communicates with various wireless sensors 104 over the RF link(s), and concentrates or collates the measurement data for transmission to an application server 108 of network 200 via a data backbone 106 of network 200. Backbone 106 may include any wired or wireless network as a matter of design choice. Some examples of a wired interface that may be used by WDC 102 to communicate with backbone 106 include Ethernet, including Power over Ethernet (POE) implementations, Universal Serial Bus (USB), Fiber optic interfaces, etc. Some examples of a wireless interface that may be used by WDC 102 to communicate with backbone 106 include IEEE 802.11, IEEE 802.15.4, Bluetooth, etc.

Application server 108 of network 200 receives and processes the data captured by wireless sensors 104 for use in the monitoring of the environment onboard aircraft 100. For instance, application server 108 may present information to a flight crew onboard aircraft 100 regarding various sensor-points captured across aircraft 100, such as a pressure in the cargo hold of aircraft 100, the temperature in the cargo hold, the temperature of a passenger cabin onboard aircraft 100, tire pressure measurements for aircraft 100, etc. Application server 108 may also manage RF channel allocations for WDC 102, assigning RF channels to WDC 102 based on a number of RF links supported by WDC 102. For example, Application server 108 may query WDC 102 to identify the number of RF links supported, may be pre-programmed with the number of RF links supported by WDC 102, etc., and allocate RF channels to WDC 102 based on the RF links supported by WDC 102. If, for example, WDC 102 supported four RF links, then Application server 108 may assign channels to WDC 102 based on this information, ensuring the WDC 102 is not assigned the same RF channel twice, which would cause interference. Further, WDC 102 may be assigned RF channels based on an algorithm that limits the RF interference between WDC 102 and other wireless data concentrators that may be nearby WDC 102. This allows application server 108 to implement a wireless networking strategy across aircraft 100.

Figure 3:
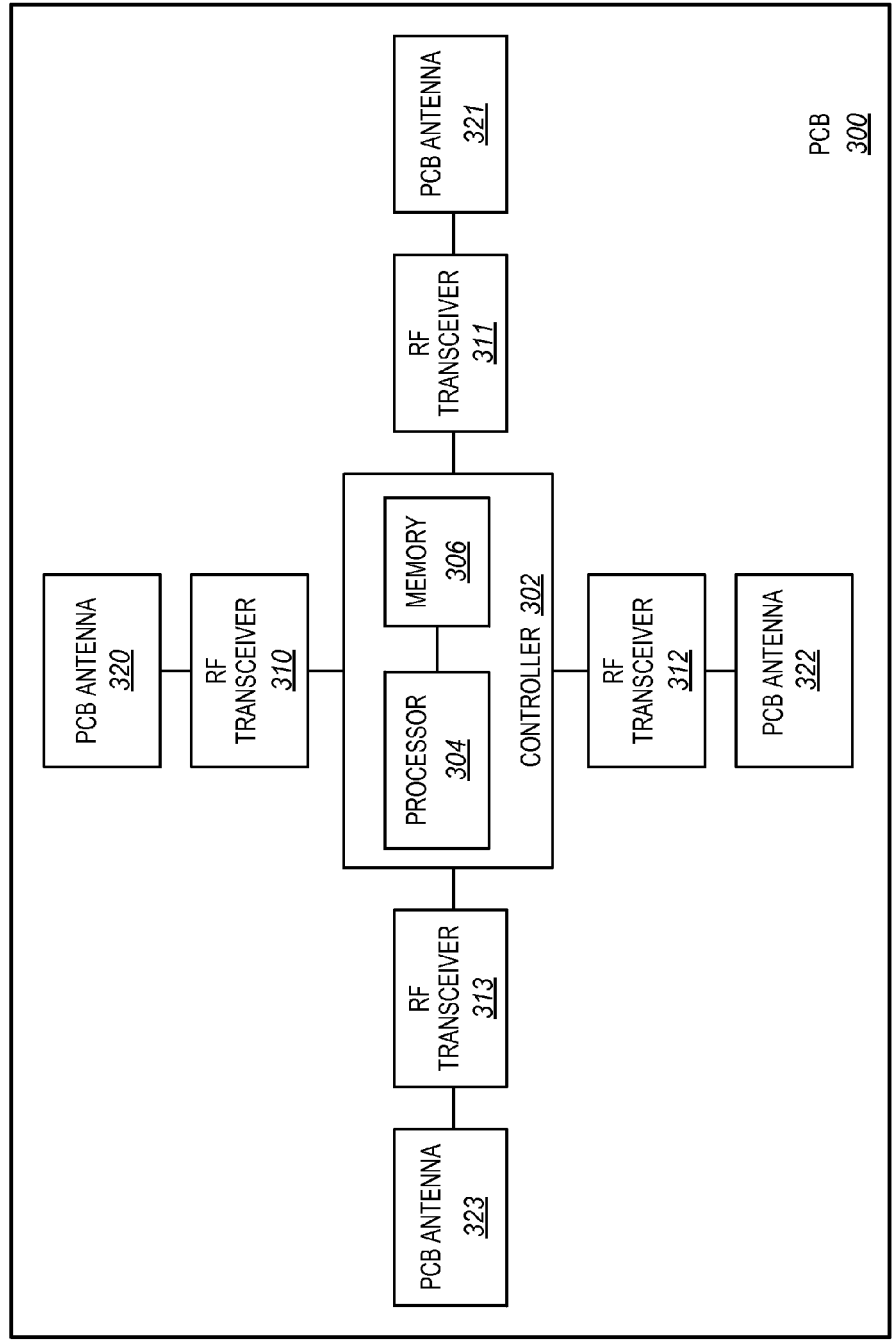
FIG. 3 is a block diagram of a wireless data concentrator for the data network of an aircraft in an exemplary embodiment.

FIG. 3 is a block diagram of WDC 102 for network 200 of aircraft 100 in an exemplary embodiment. In this embodiment, WDC 102 includes a Printed Circuit Board (PCB) 300 with a controller 302 mounted to PCB 300. Controller 302 manages RF links between WDC 102 and wireless sensors 104, collates sensor data recovered by wireless sensors 104, and provides the sensor data to application server 108. To do so, controller 302 may utilize any system, component, or device that is capable of performing such functionality. While the specific hardware implementation of controller 302 is subject to design choices, one particular embodiment may include one or more processors 304 coupled with a memory 306. Processor 304 includes any hardware device that is able to perform functions. Processor 304 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Memory 306 includes any hardware device that is able to store data. For instance, memory 306 may store sensor data recovered by wireless sensors 104 as part of a store and forward process between wireless sensors 104 and application server 108. Memory 306 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

In this embodiment, WDC 102 also includes four RF transceivers 310-313 that are electrically coupled to controller 302. Transceivers 310-313 communicate with one or more wireless sensors 104 onboard aircraft 100 over RF links. To implement RF links between WDC 102 and wireless sensors 104, RF transceivers 310-313 may utilize any system, component, or device that is able to implement RF data exchanges with wireless sensors 104. One example of RF transceivers 310-313 include IEEE 802.15.4 compliant RF transceivers, which operate within a set of RF channels defined by the IEEE 802.15.4 standard. RF transceivers 310-313 may receive command and control instructions from processor 304 to implement RF links with wireless sensors 104. Some examples of such instructions include RF channel assignments, bit rate settings, modulation settings, error correcting protocols, RF transmission power level settings, etc.

In this embodiment, WDC 102 further includes four PCB antennas 320-323 which are each electrically coupled to one of RF transceivers 310-313. PCB antennas 320-323 in this embodiment are trace antennas, which are fabricated onto PCB 300. For example, PCB antennas 320-323 may be inverted-F PCB trace antennas in some embodiments, which are a form of aperture antenna. Inverted-F antennas include a ground plane, an upper arm, and a shorting pin between the ground plane and the upper arm which forms an open end at a position away from the shorting pin. A source excitation is coupled between the upper arm and the ground plane. The RF polarization is vertical, and the radiated pattern approximates a donut with an axis of the donut in the vertical direction. PCB antennas 320-323 include any system, component, or device that are able to send and receive radio signals utilizing traces fabricated onto PCB 300.

Although the layout and the relative location of the particular devices diagrammed in FIG. 3 are a matter of design choice, the following figures and related discussion will illustrate some possible examples of various relationships between the elements of FIG. 3. However, it is not intended that WDC 102 be limited to only the specific examples in the subsequent discussions.

Figure 4:
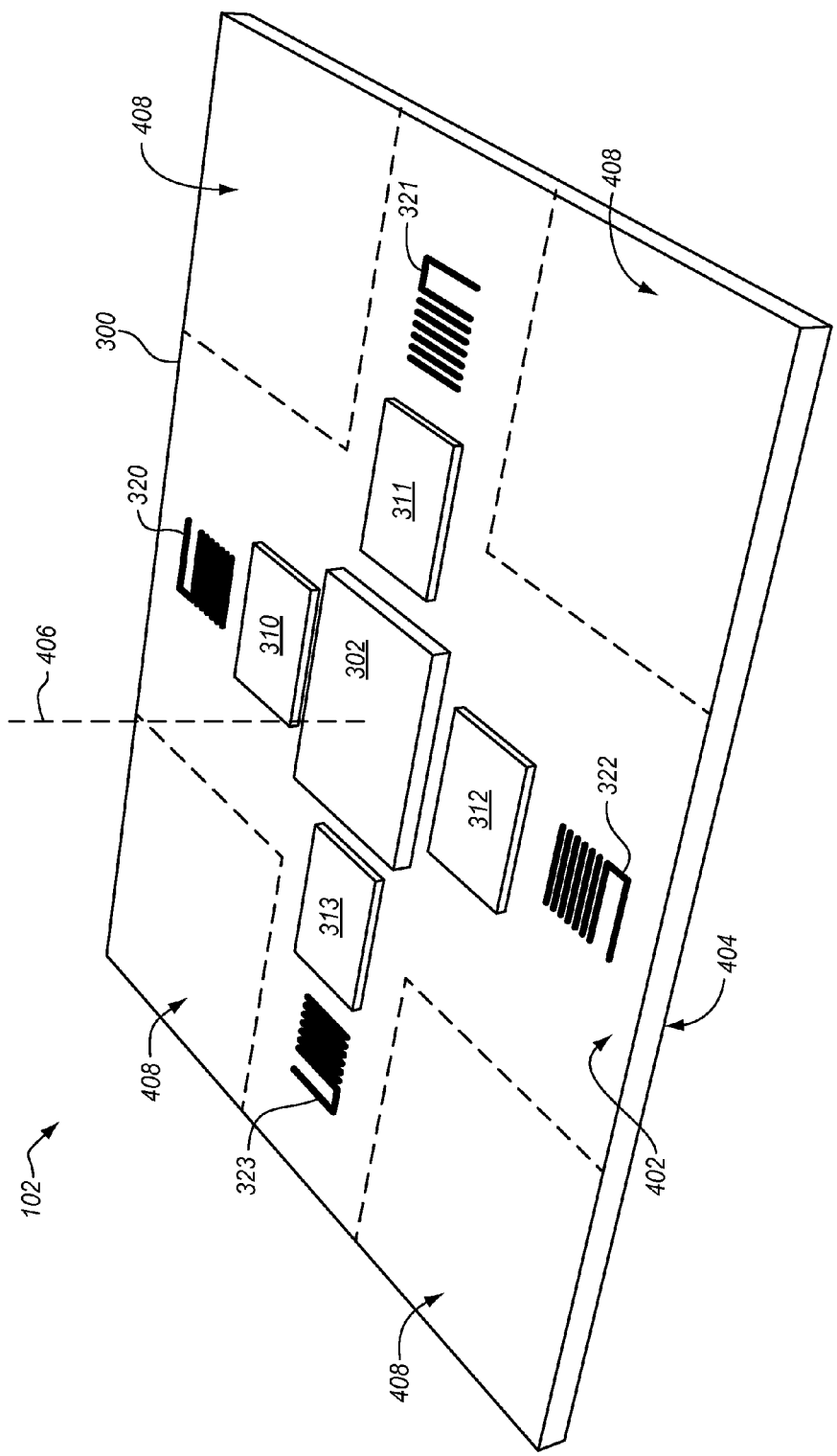
FIG. 4 is an isometric view of the wireless data concentrator of FIG. 3 in an exemplary embodiment.

FIG. 4 is an isometric view of WDC 102 in an exemplary embodiment. In this embodiment, PCB 300 includes a top surface 402 and a bottom surface 404. Controller 302 is electrically coupled to top surface 402 of PCB 300 proximate to a centerline 406 of PCB 300. Circumferentially located around controller 302 are RF transceivers 310-313, which are also electrically coupled to top surface 402 of PCB 300. In this embodiment, RF transceivers 310-313 are orthogonal to each other and arranged around controller 302.

Circumferentially located around RF transceivers 310-313 are PCB antennas 320-323, which are fabricated utilizing PCB traces along top surface 402 of PCB 300. Each of RF transceivers 310-313 is electrically coupled to a nearby RF transceiver 310-313. In this embodiment, PCB antennas 320-323 are orthogonal to each other and arranged around controller 302. The orthogonal arrangement of RF transceivers 310-313 and/or PCB antennas 320-323 minimize the RF interference presented to each other. In this embodiment, PCB antennas 320-323 are located along an outside edge of PCB 300, with RF transceivers 310-313 located in between PCB antennas 320-323 and controller 302.

In some embodiments, regions 408 located between adjacent RF transceivers 310-313 and/or PCB antennas 320-232 may be devoid of PCB traces. This may reduce the interference between adjacent RF transceivers 310-313 and/or PCB antennas 320-232. In other embodiments, PCB 300 may be fabricated with regions 408 removed, forming a cross-shaped structure.

Figure 5:
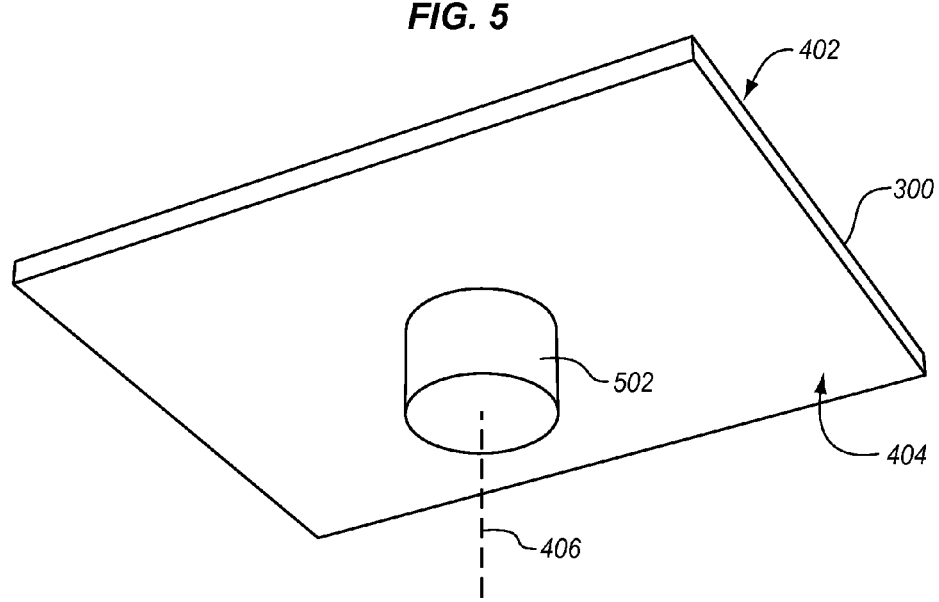
FIG. 5 illustrates a connector for the wireless data concentrator of FIG. 4 in an exemplary embodiment.

In cases where WDC 102 is wired to backbone 106, a connector may be mounted to PCB to provide the electrical signaling path. The connector may also provide electrical power to WDC 102 along with data signaling. For instance, the connector may carry power, ground, and signaling for an Ethernet connection between backbone 106 and WDC 102. FIG. 5 illustrates a connector 502 for WDC 102 in an exemplary embodiment. In this embodiment, connector 502 is mounted to bottom surface 404 of PCB 300, along centerline 406 and proximate to controller 302. Controller 302 has been removed from this view for clarity. Connector 502 electrically couples controller 302 to application server.

Figure 6:
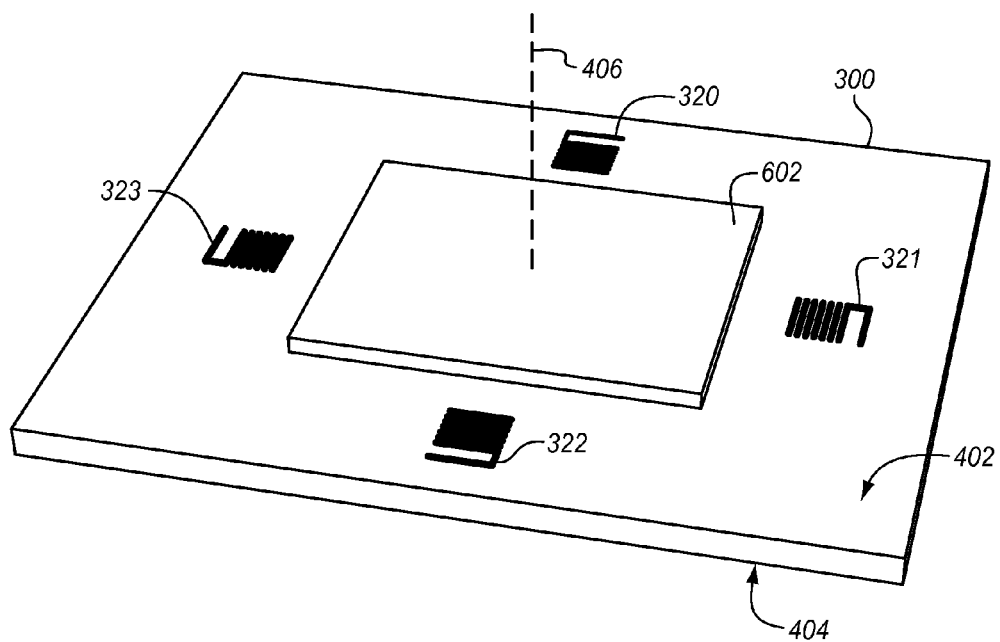
FIG. 6 illustrates a top side RF shield for the wireless data concentrator of FIG. 4 in an exemplary embodiment.
Figure 7:
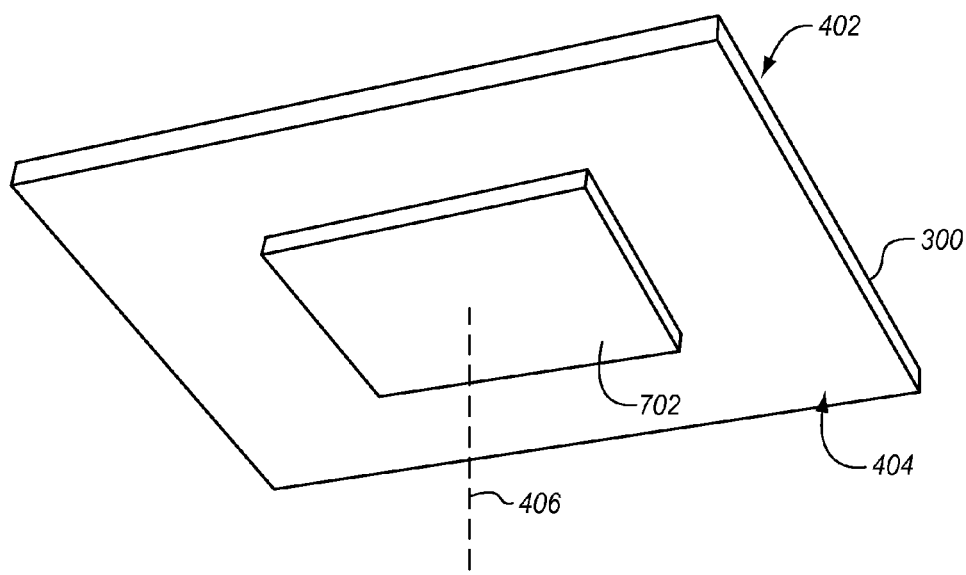
FIG. 7 illustrates a bottom side RF shield for the wireless data concentrator of FIG. 4 in an exemplary embodiment.

In an optional embodiment, an RF shield may be added to WDC 102 to provide shielding around controller 102 and RF transceivers 310-313. The RF shield may be on top surface 402 of PCB 300 and/or bottom surface 404 of PCB. FIG. 6 illustrates a top side RF shield 602 for WDC 102 in an exemplary embodiment. In this embodiment, shield 602 is metal, surrounds controller 302 and RF transceivers 310-313, and exposes PCB antennas 320-323. FIG. 7 illustrates a bottom side RF shield 702 for WDC 102 in an exemplary embodiment. In this embodiment, shield 702 is metal, and surrounds the PCB traces for RF transceivers 310-313 and controller 302 along bottom surface 404 of PCB 300. The region on bottom surface 404 of PCB 300 that is proximate to PCB antennas 320-323 is not covered by shield 702.

Shield 602 and shield 702 are capable of isolating controller 302 and/or RF transceivers 310-313 from RF fields generated by PCB antennas 320-323.

Figure 8:
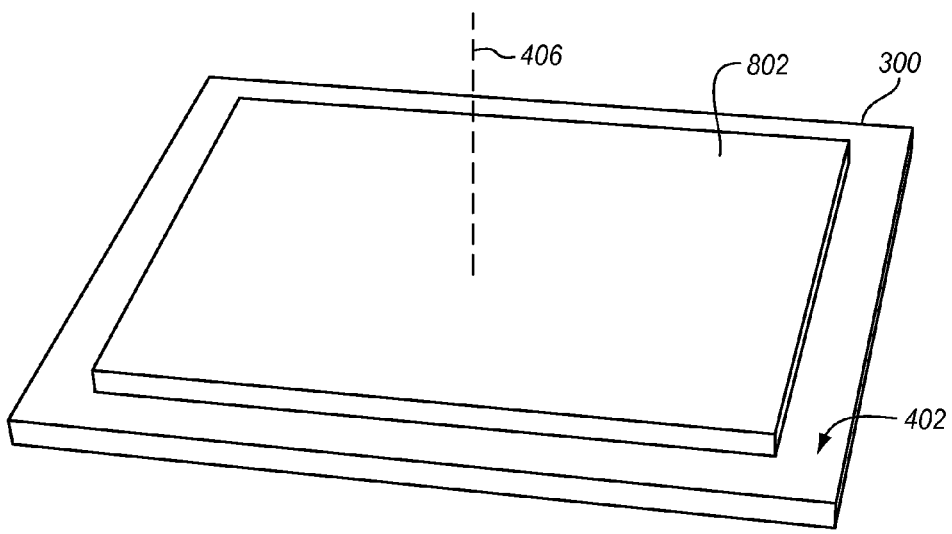
FIG. 8 illustrates a RF transparent radome for the wireless data concentrator of FIG. 4 in an exemplary embodiment.

In another optional embodiment, a RF transparent radome may be added to WDC 102 to provide mechanical protection or mechanical shielding to the components mounted to top surface 402 of PCB 300. FIG. 8 illustrates a RF transparent radome 802 mounted to top surface 402 of PCB 300. Radome 802 surrounds controller 302, RF transceivers 310-313, and PCB antennas 320-323.

Utilizing a four radio design, WDC 102 is able to provide an efficient gateway into backbone 106 for wireless sensors 104. The four radio design is an efficient use of space, which is a premium onboard aircraft 100, and also is an efficient use of RF resources. The four radio design of WDC 102 allows for fewer data concentrators to be utilized for the task of transferring sensor data from wireless sensors 104 to application server 108, and also provides a measure of redundancy by allowing other instances of WDC 102 onboard aircraft 100 to share the same wireless sensor 104. For instance, three different and independent instances of WDC 102 onboard aircraft 100 may communicate with the same wireless sensor 104, thereby providing triple failure redundancy for acquiring the sensor data from wireless sensor 104. Since the RF environment of an aircraft can be problematic due to RF reflection and RF multi-path issues, multiple radios on a single WDC helps to mitigate the effects of these issues. Further, multiple radios on a single WDC reduces the likelihood of unreachable wireless sensors due to RF coverage issues.

Figure 9:
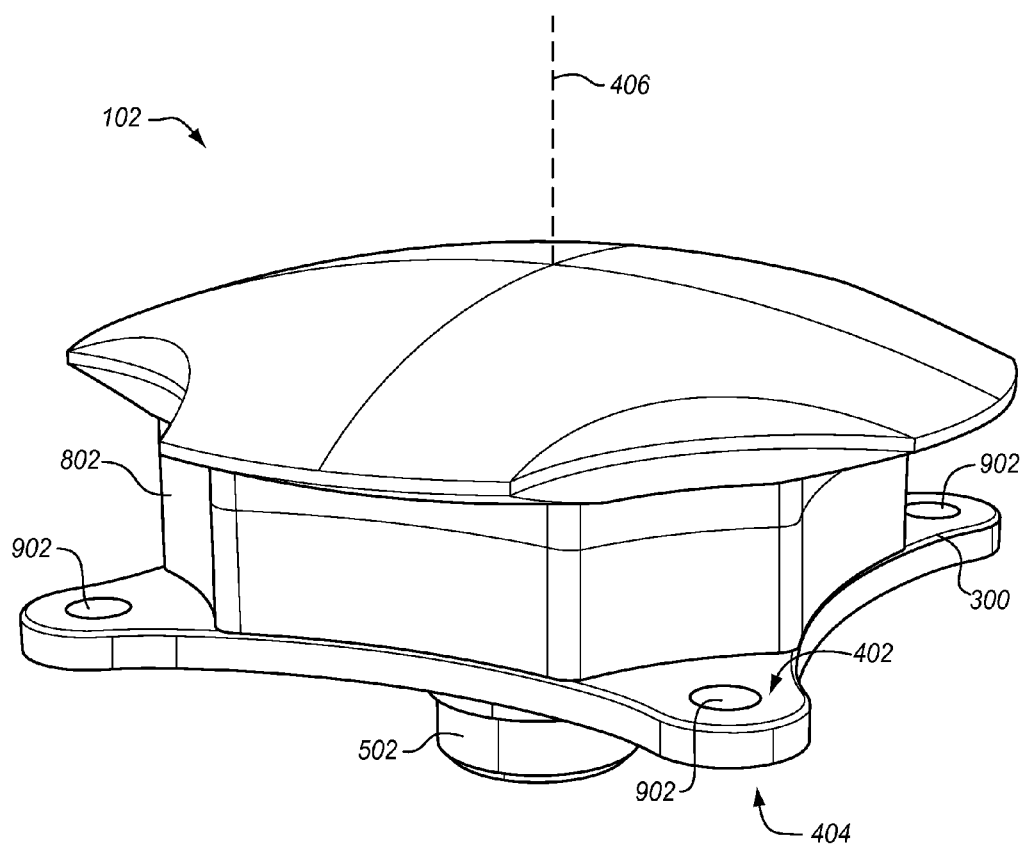
FIG. 9 illustrates a "lily-pad" design for the wireless data concentrator of FIG. 3 in an exemplary embodiment.

FIG. 9 illustrates a "lily-pad" design for WDC 102 in an exemplary embodiment. In this embodiment, PCB 300 is fabricated into a lily-pad shape, with controller 302 at the center of PCB 300 and RF transceivers 310-312 along with PCB antennas 320-323 located proximate to a set of mounting holes 902. Radome 802 obscures controller 302, RF transceivers 310-313, and PCB antennas 320-323 in this view. Connector 502 is mounted to bottom surface 404 of PCB 300 along centerline 406.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A wireless data concentrator for a data network of an aircraft, the wireless data concentrator comprising:
    a Printed Circuit Board (PCB) having a top surface and a bottom surface;
    a controller electrically coupled to the top surface of the PCB and proximate to a centerline of the PCB;
    four Radio Frequency (RF) transceivers electrically coupled to the top surface of the PCB that are disposed orthogonally to each other around the controller, each configured to communicate with the controller and at least one wireless sensor that measures an environment of the aircraft; and
    four inverted-F PCB trace antennas fabricated along the top surface of the PCB, each electrically coupled to one of the RF transceivers and disposed orthogonally to each other around the controller;
    the controller configured to receive sensor data about the environment of the aircraft from the at least one wireless sensor utilizing at least one of the RF transceivers, and to provide the sensor data to an application server of the data network of the aircraft utilizing a data backbone of the data network.

2. The wireless data concentrator of claim 1 further comprising:
    a connector coupled to the bottom surface of the PCB proximate to the centerline of the PCB that electrically couples the controller to the application server.

3. The wireless data concentrator of claim 1 further comprising:
    an RF transparent radome configured to mechanically shield the top surface of the PCB.

4. The wireless data concentrator of claim 1 further comprising:
    a metal shield proximate to the top surface of the PCB that is configured to surround the RF transceivers and the controller, and to expose the inverted-F PCB trace antennas.

5. The wireless data concentrator of claim 1 further comprising:
    a metal shield proximate to the bottom surface of the PCB that is configured to surround PCB traces for the RF transceivers and the controller, and to expose the bottom surface of the PCB that is adjacent to the inverted-F PCB trace antennas.

6. The wireless data concentrator of claim 1 wherein the sensor data about the environment of the aircraft comprises at least one of a temperature of the environment, a pressure of the environment, and a vibration of the environment.

7. The wireless data concentrator of claim 6 wherein:
    the controller is configured to forward the at least one measurement to the application server utilizing the data backbone of the network.

8. The wireless data concentrator of claim 1 wherein:
    each of the inverted-F PCB trace antennas are located along an outside edge of the PCB.

9. The wireless data concentrator of claim 8 wherein:
    an area along the outside edge of the PCB between each of the inverted-F PCB trace antennas is devoid of PCB traces.

10. The wireless data concentrator of claim 9 wherein:
the PCB is fabricated in a shape of a cross, with each of the inverted-F PCB trace antennas located in one of four ends of the cross.

11. A wireless data concentrator for a data network of an aircraft, the wireless data concentrator comprising:
a Printed Circuit Board (PCB);
a controller electrically coupled to the PCB;
four Radio Frequency (RF) transceivers electrically coupled to the PCB that are disposed around the controller, each configured to communicate with the controller and at least one wireless sensor that measures an environment of the aircraft; and
four inverted-F PCB trace antennas fabricated into the PCB, each electrically coupled to one of the RF transceivers and disposed orthogonally to each other around the controller;
the controller configured to receive sensor data about the environment of the aircraft from the at least one wireless sensor utilizing at least one the RF transceivers, and to provide the sensor data to the data network of the aircraft utilizing a data backbone of the data network.

12. The wireless data concentrator of claim 11 further comprising:
a connector coupled to the bottom surface of the PCB proximate to the controller that electrically couples the wireless data concentrator to the data backbone.

13. The wireless data concentrator of claim 12 wherein:
the controller is configured to forward the at least one measurement to the data network of the aircraft utilizing the data backbone.

14. The wireless data concentrator of claim 11 wherein:
each of the inverted-F PCB trace antennas are located along an outside edge of the PCB.

15. A wireless data concentrator for a data network of an aircraft, the wireless data concentrator comprising:
a controller electrically coupled to a Printed Circuit Board (PCB);
four Radio Frequency (RF) transceivers electrically coupled to the PCB that are disposed around the controller, each configured to communicate with the controller and at least one wireless sensor that measures an environment of the aircraft; and
four PCB trace antennas fabricated into the PCB, each electrically coupled to one of the RF transceivers and disposed orthogonally to each other around the controller;
the controller configured to receive sensor data about the environment of the aircraft from the at least one wireless sensor utilizing at least one of the RF transceivers, and to provide the sensor data to the data network of the aircraft.

16. The wireless data concentrator of claim 15 wherein:
the PCB trace antennas comprise inverted-F antennas.

17. The wireless data concentrators of claim 16 wherein:
each of the inverted-F antennas are located along an outside edge of the PCB.

* * * * *